United States Patent
Takagi et al.

(10) Patent No.: US 11,137,609 B2
(45) Date of Patent: Oct. 5, 2021

(54) HEAD-MOUNTED DISPLAY

(71) Applicant: SEIKO EPSON CORPORATION, Tokyo (JP)

(72) Inventors: Masayuki Takagi, Azumino (JP); Akira Komatsu, Kamiina-gun (JP); Takashi Takeda, Suwa (JP); Toshiaki Miyao, Chino (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/036,200

(22) Filed: Sep. 29, 2020

(65) Prior Publication Data
US 2021/0096377 A1  Apr. 1, 2021

(30) Foreign Application Priority Data
Sep. 30, 2019 (JP) .............................. JP2019-178862

(51) Int. Cl.
*G02B 27/01* (2006.01)

(52) U.S. Cl.
CPC .... *G02B 27/0172* (2013.01); *G02B 2027/014* (2013.01); *G02B 2027/0123* (2013.01); *G02B 2027/0178* (2013.01)

(58) Field of Classification Search
USPC ............................................................ 345/7
See application file for complete search history.

(56) References Cited

U.S. PATENT DOCUMENTS

| | | | | |
|---|---|---|---|---|
| 5,739,797 | A * | 4/1998 | Karasawa | G02B 27/017 345/8 |
| 6,349,001 | B1 * | 2/2002 | Spitzer | G02B 27/017 359/618 |
| 6,600,461 | B1 * | 7/2003 | Okauchi | G02B 27/017 345/8 |
| 2005/0254135 | A1 * | 11/2005 | Ou | G02B 27/017 359/630 |
| 2006/0052146 | A1 * | 3/2006 | Ou | H04N 7/185 455/575.2 |
| 2006/0250322 | A1 * | 11/2006 | Hall | G02B 27/0172 345/8 |
| 2012/0147038 | A1 * | 6/2012 | Perez | G02B 27/0172 345/632 |
| 2015/0178939 | A1 | 6/2015 | Bradski et al. | |
| 2015/0237336 | A1 * | 8/2015 | Sylvan | G02B 30/34 348/54 |
| 2017/0257620 | A1 * | 9/2017 | Takeda | G02B 27/017 |
| 2017/0363873 | A1 * | 12/2017 | Chen | G02B 27/0172 |
| 2018/0203505 | A1 * | 7/2018 | Trail | G02B 27/0093 |
| 2018/0213212 | A1 * | 7/2018 | Liu | H04N 13/332 |
| 2019/0004281 | A1 * | 1/2019 | Shi | G02B 7/09 |

FOREIGN PATENT DOCUMENTS

JP  2018-60210 A  4/2018

* cited by examiner

*Primary Examiner* — Chineyere D Wills-Burns
(74) *Attorney, Agent, or Firm* — Oliff PLC

(57) ABSTRACT

A head-mounted display includes a display device configured to display an image, a diopter adjustment device configured to adjust a diopter, and a correction processing circuit serving as an image correction device configured to correct a display image in accordance with a degree of diopter adjustment. In the adjustments made on a left side and a right side, respectively, after diopter adjustment, the display image is corrected in accordance with the degree of diopter adjustment.

9 Claims, 14 Drawing Sheets

HEAD-MOUNTED DISPLAY

The present application is based on, and claims priority from JP Application Serial Number 2019-178862, filed Sep. 30, 2019, the disclosure of which is hereby incorporated by reference herein in its entirety.

BACKGROUND

1. Technical Field

The present invention relates to a head-mounted display (HMD) configured to present a virtual image to an observer.

2. Related Art

As a virtual reality and an augmented reality system corresponding to one mode of a head-mounted display (HMD), there is known, for example, a system configured to change an accommodation, that is, adjust a focus, of an eye, and capable of targeting a non-telecentric optical system as well (JP-A-2018-60210).

With the demand for HMD miniaturization, it is desirable or essential to configure the HMD using a non-telecentric optical system. However, in the case of a non-telecentric optical system, when the position of each component is adjusted for diopter adjustment (focus adjustment), there is a high possibility that a change in angle of view and screen distortion will occur. In particular, in the case of a binocular type HMD, the diopter may be adjusted to different diopters on a left side and a right side, resulting in different screen sizes and distortion states on the left side and the right side, which may lead to fatigue during extreme viewing. Therefore, in JP-A-2018-60210, even when a magnification change is synchronized with a focus change of imaging light in accordance with the focus change to compensate for this by software, for example, simply correcting the magnifications of the optical systems on the left side and the right side in accordance with the focus change using the same correction table may cause a situation to arise in which a difference occurs between the left side and the right side in the image sizes to be visually recognized, or the like.

SUMMARY

A head-mounted display according to an aspect of the present disclosure includes a first display device configured to display an image on one of a left side and a right side, a first diopter adjustment device configured to adjust a diopter of the first display device, a first image correction device configured to correct an image displayed by the first display device in accordance with a degree of diopter adjustment by the first diopter adjustment device, a second display device configured to display an image on the other of the left side and the right side, a second diopter adjustment device configured to adjust a diopter of the second display device, and a second image correction device configured to correct an image displayed by the second display device in accordance with a degree of diopter adjustment by the second diopter adjustment device.

DESCRIPTION OF EXEMPLARY EMBODIMENTS

First Exemplary Embodiment

Below, an example of a head-mounted display according to a first exemplary embodiment of the present disclosure will be described with reference to the accompanying drawings.

Figure 1:
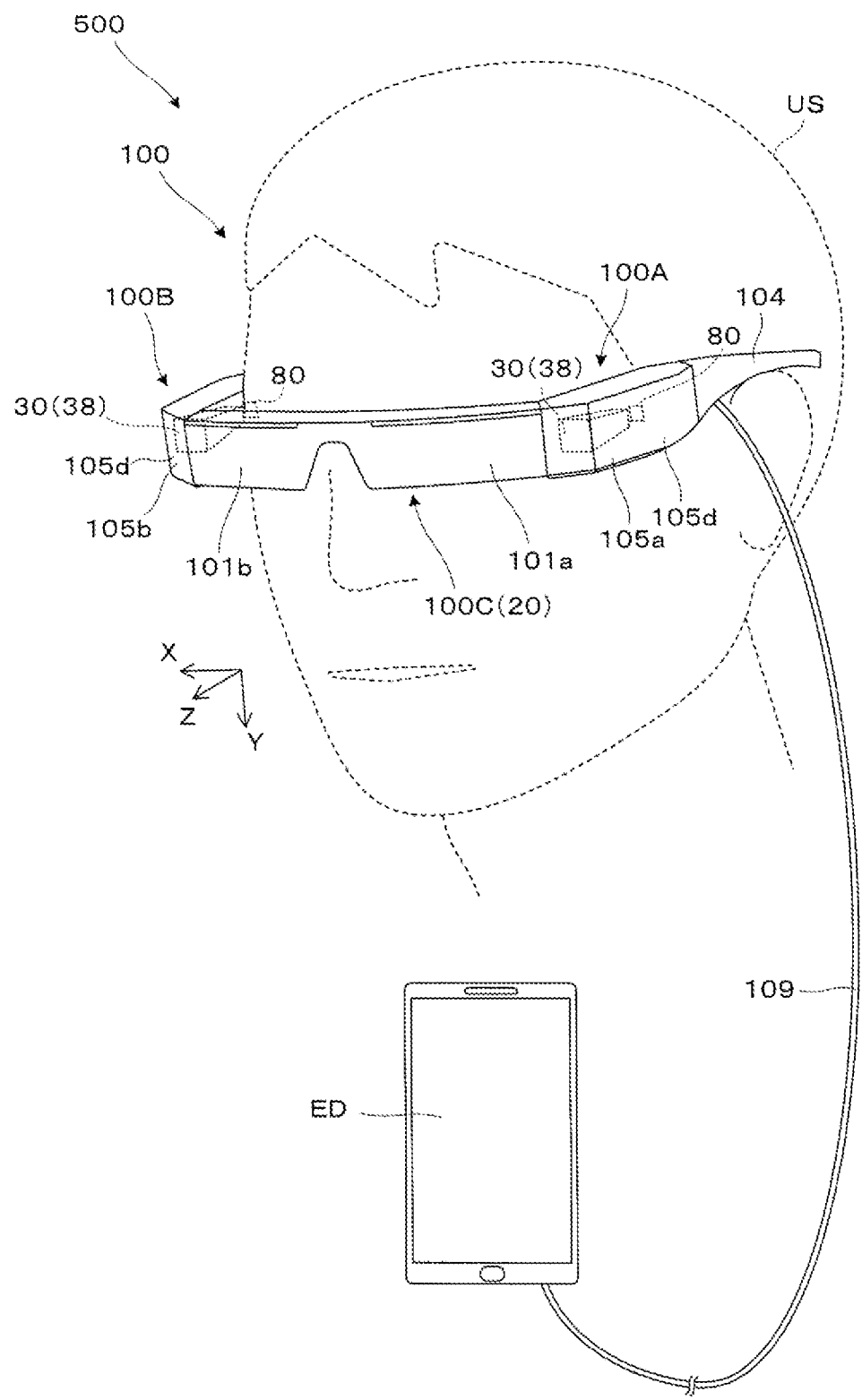
FIG. 1 is a perspective view illustrating a state of use of a head-mounted display according to an exemplary embodiment.

As illustrated in FIG. 1 and the like, a wearable display device 100 serving as a head-mounted display (HMD) according to this exemplary embodiment has an appearance like glasses. Note that the wearable display device 100 is coupled, via a cable 109, to an external device ED, and the wearable display device 100 and the external device ED constitute a display system 500. The external device ED is a device for performing various processes on an image to be projected on the wearable display device 100 and outputting image signals and the like to the wearable display device 100, and can be configured by downloading a required app to a smartphone or the like, for example.

The wearable display device 100, as the HMD, is an optical main body portion for image formation. In FIG. 1 and the like, X, Y, and Z are an orthogonal coordinate system, a +X direction corresponds to a lateral direction in which both eyes of a user US or an observer US wearing the wearable display device 100 are aligned, a +Y direction corresponds to a downward direction orthogonal to the lateral direction in which both eyes of the user US are aligned, and a +Z direction corresponds to a front direction of the observer US or a front surface direction. Note that, when X, Y, and Z are defined as directions of the wearable display device 100, first, an X-axis corresponds to an axis in a direction in which two light-guiding members 10a, 10b (refer to FIG. 2) constituting a first display device 100A and a second display device 100B are aligned. A Z-axis corresponds to an axis in an emitting direction of imaging light (image light) from the light-guiding members 10a, 10b. A Y-axis corresponds to an axis orthogonal to both the X-axis and the Z-axis.

Note that the cable 109 coupling the wearable display device 100 and the external device ED can be constituted by, for example, a USB Type-C connector, and a content image can be displayed on the wearable display device 100 on the basis of an image signal from the external device ED constituted by a smartphone or the like upon receipt of image data transmitted in an alternate mode of the USB Type-C connector.

As illustrated in FIG. 1 and the like, the wearable display device 100 is an optical device capable of not only allowing the user (observer) US using the wearable display device 100 to visually recognize a virtual image, but also to observe an external world image in a see-through manner. As described above, the wearable display device 100 can be communicatively coupled, via the cable 109, to the external device ED, and can form a virtual image corresponding to the image signal input from the external device ED, for example. Note that while, herein, the wearable display device 100 is described as an optical device or a virtual image display device configured to allow a user to visually recognize a virtual image such as described above, in addition to the wearable display device 100 as such an optical device, the display system 500 in its entirety, including the portion of the external device ED or the portion corresponding thereto, may be regarded as the wearable display device or the HMD.

The wearable display device 100 includes the first display device 100A and a second display device 100B. The first display device 100A and the second display device 100B are portions that form a virtual image for a left eye and a virtual image for a right eye, respectively. The first display device 100A for the left eye includes a first virtual image formation optical portion 101a that transparently covers an area in front of the eye of the user (observer) US, and a first image formation main body portion 105a that forms imaging light. The second display device 100B for the right eye includes a second virtual image formation optical portion 101b that transparently covers an area in front of the eye of the user US, and a second image formation main body portion 105b that forms imaging light. That is, images corresponding to the left eye and the right eye are displayed by the first display device 100A and the second display device 100B.

Temples 104, each a portion extending rearward from a side surface of a head, are respectively attached to rear portions of the first and second image formation main body portions 105a, 105b, and abut ears, temples, or the like of the user, ensuring a mounted state of the wearable display device 100. Further, the first image formation main body portion 105a includes a display element 80, a lens barrel 38, and the like in an outer case 105d that is cover-like. Similarly, the second image formation main body portion 105b includes the display element 80, the lens barrel 38, and the like in the outer case 105d. A specific example of an optical configuration of these components will be described later with reference to FIG. 2 and the like.

A specific example of an optical structure and the like of such a wearable display device 100 that forms a virtual image as described above is illustrated below with reference to FIG. 2 and the like.

Figure 2:
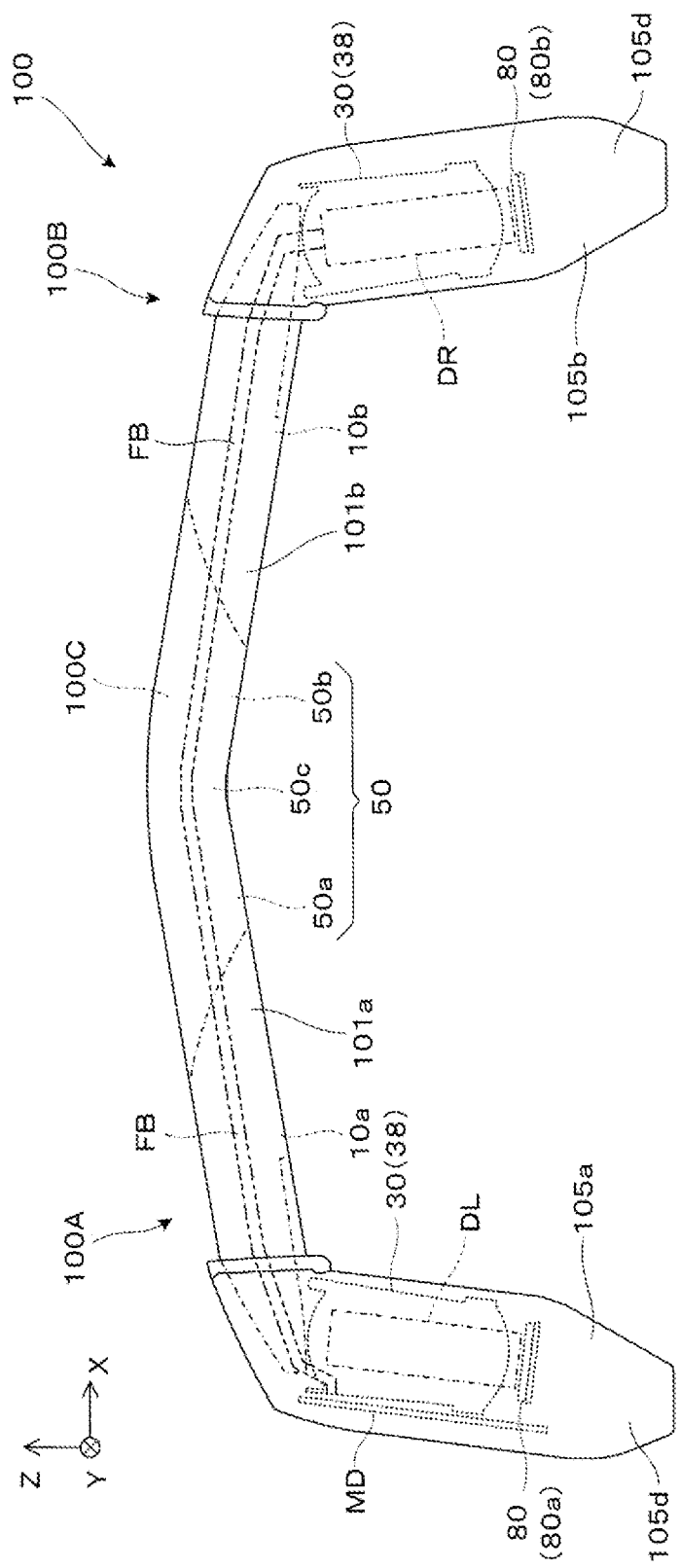
FIG. 2 is a plan view illustrating an optical configuration of a display device.
Figure 3:
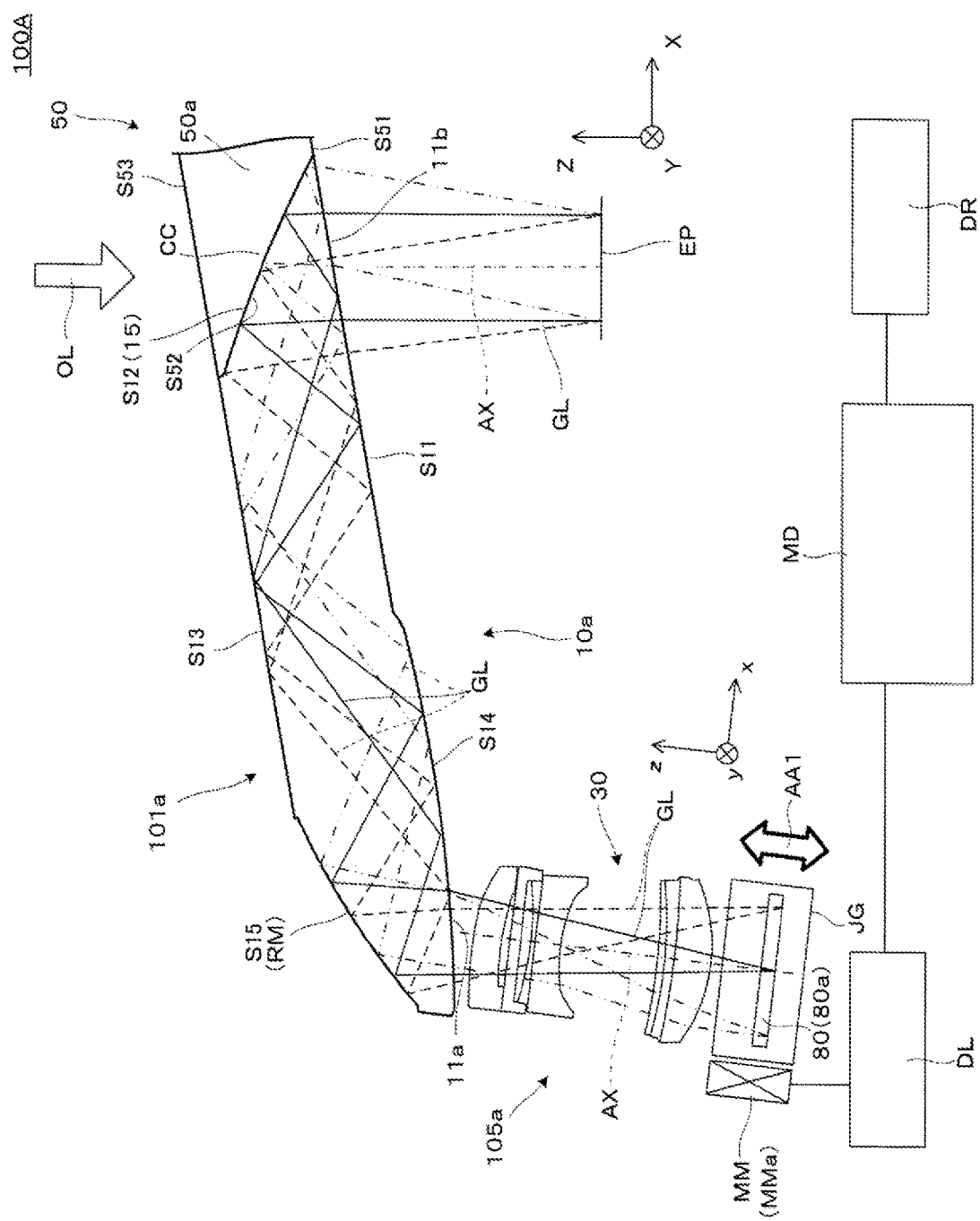
FIG. 3 is a plan view for describing an optical structure of the display device.

FIG. 2 is a conceptual plan view illustrating an optical configuration of the wearable display device 100, which is a display device. Further, FIG. 3 is a plan view for describing the optical structure the wearable display device 100.

First, as illustrated in FIG. 2, the first and second virtual image formation optical portions 101a, 101b respectively include first and second light-guiding members 10a, 10b, which are light guides formed of a resin material or the like, and are coupled at a center by a central member 50 to form, as an integral member, a transparent light-guiding unit 100C. In other words, the transparent light-guiding unit 100C is a light-guiding unit that includes the pair of light-guiding members 10a, 10b and the central member 50. The pair of light-guiding members 10a, 10b are a pair of optical members that, as members constituting the first and second virtual image formation optical portions 101a, 101b, contribute to the formation of a virtual image while propagating imaging light internally. The central member 50 includes a pair of light-transmitting portions 50a, 50b and a bridge portion 50c connecting these, is an integrally molded component formed of a resin material or the like, and, with the pair of light-transmitting portions 50a, 50b joined to the pair of light-guiding members 10a, 10b, functions as a coupling member that couples the first display device 100A and the second display device 100B. More specifically, in the central member 50, the light-transmitting portion 50a, which is one of the pair of light-transmitting portions 50a, 50b, is joined to the light-guiding member 10a, and the other light-transmitting portion 50b is joined to the light-guiding member 10b. Note that, in the illustrated example, as illustrated in FIG. 2, for example, a portion extending from the bridge portion 50c to the light-transmitting portion 50a and a portion extending from the bridge portion 50c to the light-transmitting portion 50b of the central member 50 are each smoothly connected so as not to have a bent portion (elbow-shaped portion). With the absence of a location such as a bent portion (elbow-shaped portion) or a step portion, a double appearance of the external world image is avoided.

Note that the transparent light-guiding unit 100C is supported by the outer case 105d at both end portions, that is, on outer end sides of the light-guiding members 10a, 10b, as a light-guiding device 20 of a combined type that provides an image for both eyes to the user US by light guidance.

Further, the first image formation main body portion 105a includes the display element 80, the lens barrel 38, a main printed wired board MD, a left eye printed wired board DL, and the like in the cover-like outer case 105d. The main printed wired board MD is coupled to each portion by a flexible board FB serving as a cable. On the other hand, the second image formation main body portion 105b includes the display element 80, the lens barrel 38, a right eye printed wired board DR, and the like in the outer case 105d. Note that the outer case 105d is made of, for example, a magnesium alloy or the like.

For example, in the first image formation main body portion 105a, the display element 80 (80a) housed in the outer case 105d is a display device that emits imaging light to form an image corresponding to a virtual image for the left eye, and is constituted by, for example, an organic electro-luminescent (EL) display panel, a liquid crystal display (LCD) panel, or the like. A projection lens 30 emits imaging light from the display element 80, and constitutes a portion of an imaging system in the first virtual image formation optical portion 101a. The lens barrel 38, as a portion of the projection lens 30, holds an optical element (not illustrated) for image formation that constitutes the projection lens 30. Note that, for the second image formation main body portion 105b as well, the display element 80 (80b) housed in the outer case 105d and the projection lens 30 including the lens barrel 38 perform the same function to form an image corresponding to a virtual image for the right eye. Further, hereinafter, with regard to the left and right display elements 80, the display element for the left eye is also referred to as the first display element 80a, and the display element for the right eye is also referred to as the second display element 80b.

The optical structure of the wearable display device 100 will be described below with reference to FIG. 3. FIG. 3 is a drawing illustrating a portion of the first display device 100A of the wearable display device 100, and particularly describes the optical structure of the first virtual image formation optical portion 101a. While the wearable display device 100 is configured by the first display device 100A and the second display device 100B (refer to FIG. 1 and the like) as described above, the first display device 100A and the second display device 100B are symmetrical and have equivalent structures. Therefore, the first display device 100A will be described only, and a description of the second display device 100B will be omitted. Note that the light-guiding member 10p includes first to fifth surfaces S11 to S15 having an optical function when imaging light is guided. Of these, the first surface S11 and the third surface S13 that occupy primary positions in front of the eye are parallel planes.

The light-transmitting portion 50a includes a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is on an extended surface of the first surface S11 of the light-guiding member 10, the second transmission surface S52 is a curved surface that is joined to and integrated with the second surface S12, and the third transmission surface S53 is on an extended surface of the third surface S13 of the light-guiding member 10.

The light-guiding member 10a of the first virtual image formation optical portion 101a is joined to the light-transmitting portion 50a via an adhesive layer CC. That is, the second transmission surface S52 of the light-transmitting portion 50a is disposed facing and has the same shape as the second surface S12 of the light-guiding member 10a. The light-guiding member 10a and the light-transmitting portion 50a have a structure in which the surface of the main body member imparting a three-dimensional shape, including the optical surface, is coated with a thin hard coat layer. The main body members of the light-guiding member 10a and the light-transmitting portion 50a are formed from a resin material with high optical transparency in a visible range and are molded, for example, by pouring a thermoplastic resin into a mold and curing the resin.

Below, an overview of an optical path of an imaging light GL will be described. The light-guiding member 10a guides the imaging light GL emitted from the projection lens 30 toward the eye of the user (observer) US by reflection of the imaging light GL by the first to fifth surfaces S11 to S15 and the like. Specifically, the imaging light GL from the projection lens 30 is first incident on the fourth surface S14 formed on a light incidence portion 11a and reflected by the fifth surface S15, which is an inner surface of a reflective film RM, is incident again from an inner side on and totally reflected by the fourth surface S14, is incident on and totally reflected by the third surface S13, and is incident on and totally reflected by the first surface S11. The imaging light GL totally reflected by the first surface S11 is incident on the second surface S12, is partially reflected while partially passing through a half mirror 15 provided on the second surface S12, and is once more incident on and passes through the first surface S11 formed on a light-emitting portion 11b. The imaging light GL passing through the first surface S11 travels as a whole along an optical axis AX substantially parallel to the Z direction, and is incident as a substantially parallel luminous flux on an exit pupil EP where the eye of the user US is disposed. That is, the user US observes an image by the imaging light GL as a virtual image.

Further, the first virtual formation optical portion 101a is configured to allow the user US to visually recognize the imaging light by the light-guiding member 10a, and also allow the user US to observe an external world image having little distortion with the light-guiding member 10a and the light-transmitting portion 50a in a combined state. At this time, because the third surface S13 and the first surface S11 are substantially parallel to each other, the diopter is substantially 0 in relation to the observation obtained by transmission through this portion, and substantially no aberration or the like occurs with an external light OL. Further, the third transmission surface S53 and the first transmission surface S51 are planes substantially parallel to each other. Furthermore, because the first transmission surface S51 and the first surface S11 are planes substantially parallel to each other, substantially no aberration or the like occurs. As described above, the user US observes the external world image that is free of distortion through the light-transmitting portion 50a.

In the above, in this exemplary embodiment, the optical system including the light-guiding member 10a and the projection lens 30 is non-telecentric. Accordingly, for example, for the emitted light from the first display element 80a, a main beam of center light near the optical axis AX is substantially parallel to the optical axis AX (slope: 0°), while a main beam of ambient light far from the optical axis AX has a slope of about 10°. In a case in which the system is configured by such a non-telecentric optical system, diopter adjustment is possible by simply slightly changing an arrangement between optical members, that is, relative distances between the light-guiding member 10a, the projection lens 30, and the first display element 80a.

In this exemplary embodiment, in order to adjust the diopter of the first display device 100A, the first display element 80a is movable relative to the projection lens 30 along the optical axis AX indicated by a bi-directional arrow AA1. That is, the first display device 100A is configured to move the first display element 80a, serving as a first optical member to be moved in the direction of the optical axis AX, relative to the light-guiding member 10a and the projection lens 30, serving as a first non-telecentric optical system. More specifically, in the illustrated example, a posture of the first display element 80a is fixed by a jig JG having a housing shape and moved for each jig JG by a drive mechanism MM (MMa), allowing a panel surface of the first display element 80a to advance and retreat in the direction of the optical axis AX, that is, in the ±Z direction, while maintaining a state of being perpendicular to the direction of the optical axis AX.

Figure 4:
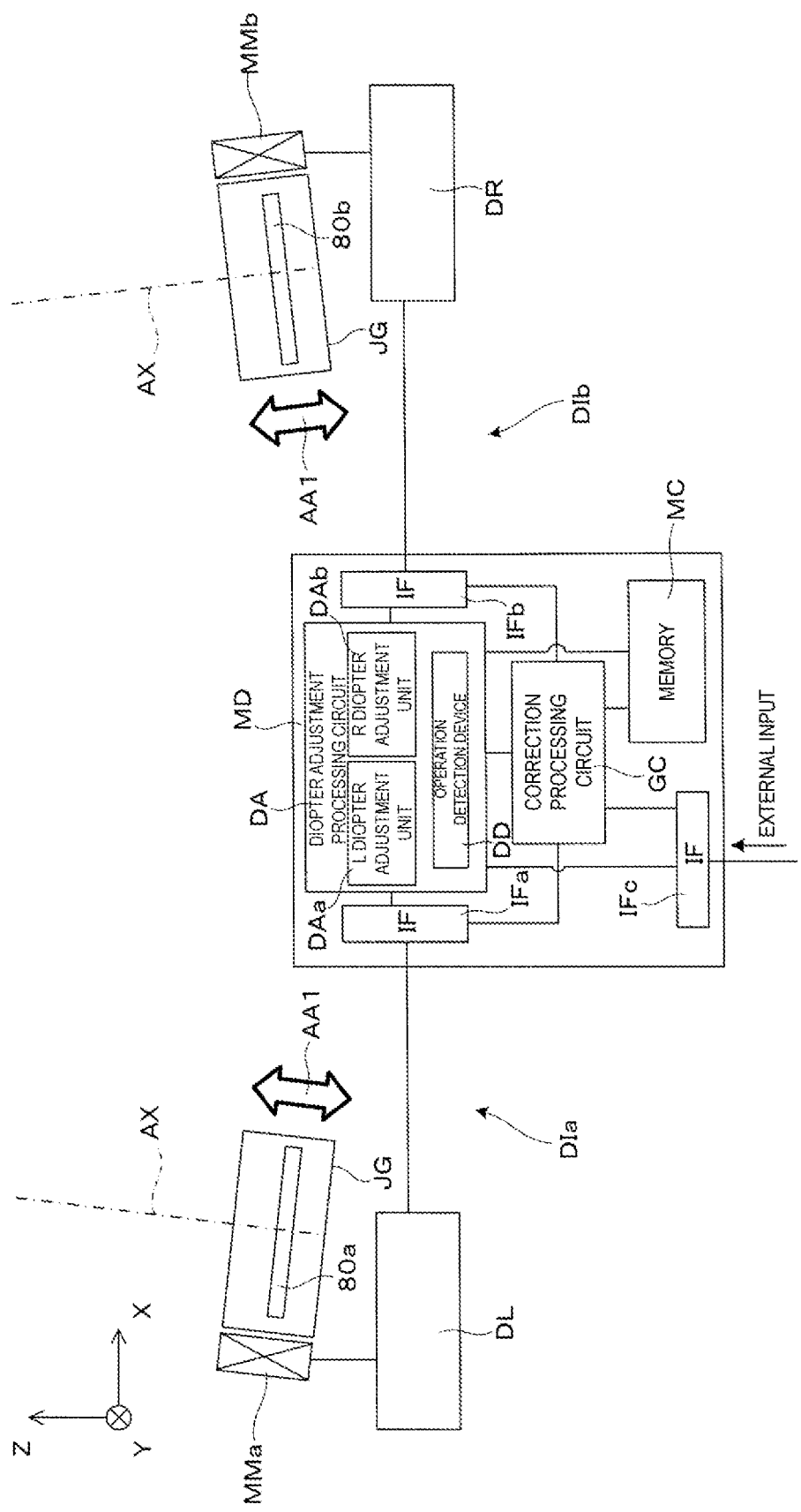
FIG. 4 is a block diagram illustrating a configuration example for describing diopter adjustment of the display device.

Further, specifically, as described later with reference to FIG. 4, the drive mechanism MMa (MM) that drives the first display element 80a for the right eye is constituted by a screw mechanism or the like, is coupled, via the left eye printed wired board DL, to the main printed wired board MD, and moves the first display element 80a in accordance with a command from the main printed wired board MD.

Here, when the optical member is moved in a non-telecentric optical system such as described above, a change in size and in shape occurs in the image to be formed. In particular, in the case of a configuration in which imaging light is guided from different directions on the left side and the right side as in this exemplary embodiment, the manner of change differs between the right eye side and the left eye side. Therefore, even when an attempt is made to display the same image on the right eye side and the left eye side, for example, there is concern that the user US may feel uncomfortable due to the difference in the manner of deformation and size of the images on the left side and the right side, and experience an increase in fatigue associated with the attempt to process and resolve this difference in his or her mind. In light of such points, in this exemplary embodiment, image correction corresponding to a degree of the diopter adjustment described above, that is, image correction corresponding to a value of a diopter D serving as an index indicating the extent to which the display element 80a has been moved (displacement of the optical member), is performed for each of the left side and the right side. That is, the greater the diopter adjustment (the greater the displacement of the display element 80a), the greater the amount of image correction.

Below, a configuration example pertaining to diopter adjustment of the wearable display device 100 will be described with reference to the block diagram of FIG. 4. As illustrated and described above, the wearable display device 100 performs diopter adjustment by moving the first display element 80a along the optical axis AX. Similarly, as a configuration for adjusting the diopter of the second display device 100B, in the second display device 100B as well, a posture of the second display element 80b is fixed by the jig JG having a housing shape and moved for each jig JG by a drive mechanism MMb, allowing a panel surface of the second display element 80b to advance and retreat in the direction of the optical axis AX while maintaining a state of being perpendicular to the optical axis AX. That is, the second display device 100B is configured to move the second display element 80b, serving as a second optical member to be moved in the direction of the optical axis AX, relative to the light-guiding member 10b and the projection lens 30, serving as a second non-telecentric optical system.

The main printed wired board MD is coupled, via the left eye printed wired board DL and the right eye printed wired board DR, to the drive mechanisms MMa, MMb, respectively. More specifically, the main printed wired board MD issues commands to the left eye printed wired board DL and the right eye printed wired board DR to advance or retreat from interface portions IFa, IFb corresponding thereto respectively, and acquires information pertaining to displacement as information pertaining to an operation of movement from the drive mechanisms MMa, MMb. Although specific drawings and the like are omitted, for example, for the various commands provided to the external device ED (refer to FIG. 1), an adjustment dial, a button, or the like is prepared that allows the user US to select or increase or decrease the diopter (value of the diopter D) indicating the degree of diopter adjustment determined by the display elements 80a, 80b being driven and, when the user US performs an operation such as pressing the button at the time of adjusting the diopter, the main printed wired board MD that receives this operation issues a command pertaining to the movement operation of the corresponding drive mechanism MMa or MMb. Further, for example, given that the drive mechanisms MMa, MMb are threaded structures, the main printed wired board MD acquires information for enabling identification of the displacements of the first display element 80a and the second display element 80b, such as a direction of advancing or retreating, a number of turns of the screw, or the like in relation to rotation of the screw.

In order to perform the processing operation described above, a diopter adjustment circuit DA is provided to the main printed wired board MD in the illustrated example. This diopter adjustment circuit DA includes a left eye diopter adjustment unit DAa for performing various necessary operation processing such as the operation processing of the drive mechanism MMa for the left eye, and a right eye diopter adjustment unit DAb for the right eye. That is, the left eye diopter adjustment unit DAa functions in cooperation with the drive mechanism MMa as a first diopter adjustment device DIa that adjusts the diopter for the left eye, and the right eye diopter adjustment unit DAb functions in cooperation with the drive mechanism MMb as a second diopter adjustment device DIb for adjusting the diopter for the left eye. Further, the first diopter adjustment device DIa and the second diopter adjustment device DIb are capable of calculating the degree of diopter adjustment, that is, the value of the diopter D, from the identified displacements of the first display element 80a and the second display element 80b.

Further, in addition to the above, the diopter adjustment circuit DA includes an operation detection device DD that detects the operation of the drive mechanisms MMa, MMb. That is, in the diopter adjustment circuit DA, the operation detection device DD detects which of the drive mechanisms MMa, MMb is operating. The operation detection device DD displays a diopter adjustment screen on, from among the first display device 100A and the second display device 100B, the display device on a side where operation for diopter adjustment, that is, operation of the drive mechanism MMa or MMb, is detected and, in contrast, suppresses display on the display device on a side where operation is not detected. As a result, the user US can sequentially perform diopter adjustment of one eye.

The diopter adjustment circuit DA, by operating each component described above, makes it possible to individually adjust the diopter for each of the right eye and the left eye and measure the degree of diopter adjustment.

Upon completion of diopter adjustment for both the right eye and the left eye, the diopter adjustment circuit DA outputs the completion status along with the degree of diopter adjustment resulting from measurement to a correction processing circuit GC that corrects the circuit DA image display. The correction processing circuit GC starts correction after confirming completion of diopter adjustment.

Figure 5:
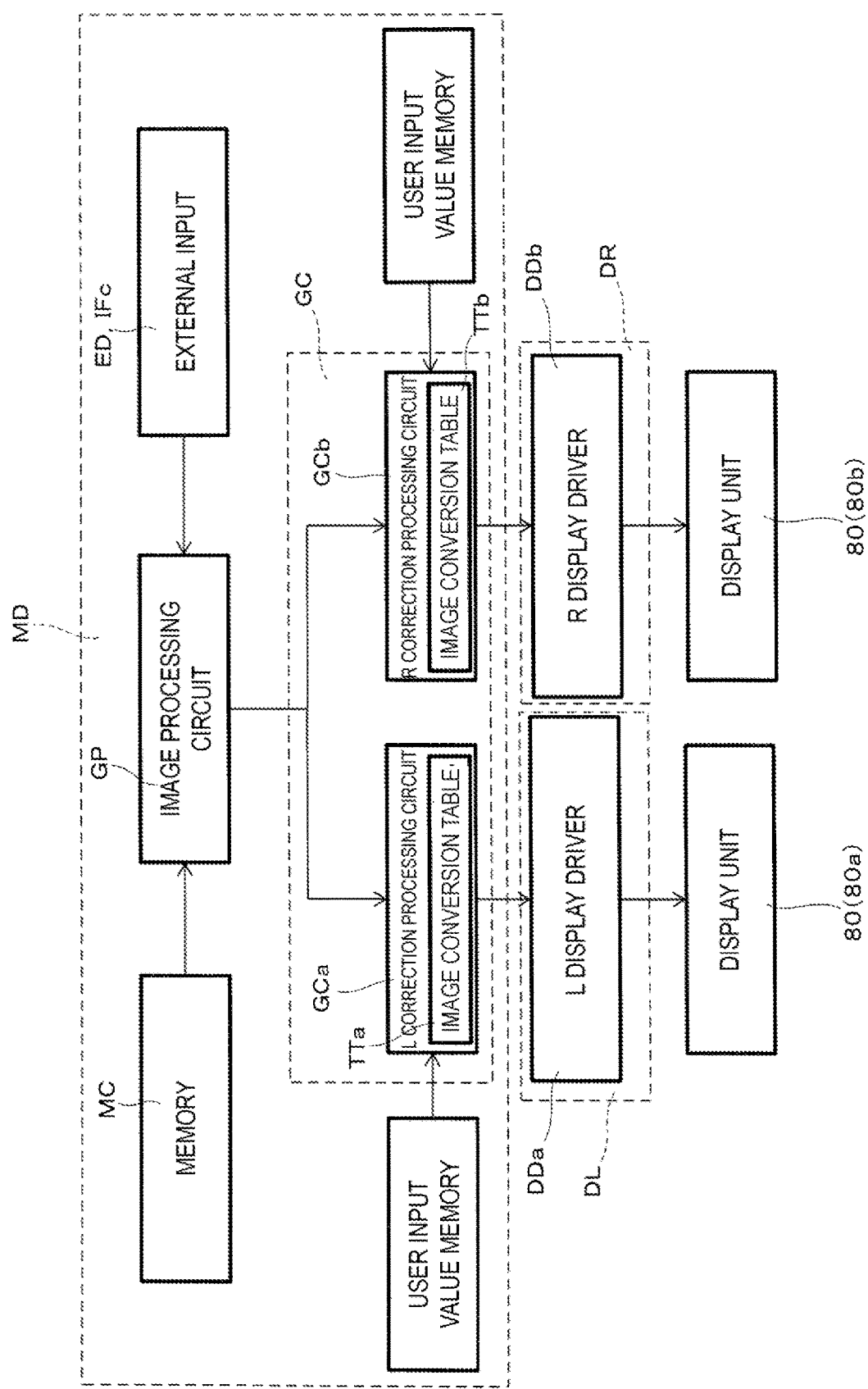
FIG. 5 is a block diagram illustrating a configuration example for describing image correction of the display device.

Below, a configuration example pertaining to image correction of the wearable display device 100 will be described with reference to the block diagram of FIG. 5.

First, as a premise, in the main printed wired board MD, various processing for image formation is performed in an image processing circuit GP on the basis of image data in a memory MC and various data input from the external device ED (refer to FIG. 1) via the interface unit IFc, as illustrated. In this case, when diopter adjustment is performed according to a command from the user US in the diopter adjustment circuit DA described in FIG. 4, the correction processing circuit GC corrects the image to be displayed in accordance with the degree of diopter adjustment in the first diopter adjustment device DIa and the second diopter adjustment device DIb for both the image for the left eye and the image for the right eye.

The correction processing circuit GC includes a left eye correction processing circuit GCa and a right eye correction processing circuit GCb to support distortion correction and the like for the left eye and the right eye. The left eye correction processing circuit GCa and the right eye correction processing circuit GCb correct a distortion and correct an enlargement or reduction of size that occurred in the first diopter adjustment device DIa and the second diopter adjustment device DIb.

Of these, the left eye correction processing circuit GCa functions as a first image correction device that, when a user input value for the left eye is received as a result of the diopter adjustment according to the command from the user US, corrects the display image for the left eye in accordance thereto. That is, the left eye correction processing circuit GCa is a first image correction device that corrects the display image by the first display device 100A in accordance with the degree of diopter adjustment in the first diopter adjustment device DIa.

Similarly, the right eye correction processing circuit GCb functions as a second image correction device that corrects the display image by the second display device 100B in accordance with the degree of diopter adjustment in the second diopter adjustment device DIb.

Here, the left eye correction processing circuit GCa and the right eye correction processing circuit GCb correct the display image on the basis of image conversion tables TTa, TTb for correction. In the image conversion tables TTa and TTb, for example, correction amounts corresponding to degrees of diopter adjustment measured by the first diopter adjustment device DIa and the second diopter adjustment device DIb are defined in a step-wise manner in advance. For example, it is conceivable to adopt a mode in which a range of change in the degree of diopter adjustment, that is, a range of the changing diopter (value of the diopter D), more specifically, the displacement when the display elements 80a, 80b are driven, is separated into 10 steps, and correction patterns 1 to 10 corresponding to correction amounts 1 to 10 of each step are defined in advance. In this case, the left eye correction processing circuit GCa and the right eye correction processing circuit GCb select one correction pattern from among the 10 types of correction patterns in accordance with the degree of diopter adjustment. Alternatively, the 10 types of correction patterns defined in advance may be provided with portions where the ranges of the diopter (values of the diopter D) partially overlap, and one correction pattern may be selected from a plurality of correction patterns of the overlapping portion. That is, a mode may be adopted in which, for a certain diopter (value of the diopter D), the user US is allowed to select a correction pattern that he or she thinks is most suitable from a plurality of correction patterns (for example, two or three correction patterns).

As described above, it is possible to adopt a mode in which, for the left eye correction processing circuit GCa and the right eye correction processing circuit GCb serving as the first image correction device and the second image correction device, a single or a plurality of correction patterns are selected from correction amounts in the image conversion tables TTa, TTb defined in a step-wise manner in accordance with the degree of diopter adjustment by the first diopter adjustment device DIa and the second diopter adjustment device DIb.

The left eye correction processing circuit GCa and the right eye correction processing circuit GCb correct the images from the image processing circuit GP in accordance with the selected correction pattern, and output the corrected images to the left eye printed wired board DL and the right eye printed wired board DR, respectively, and the left eye printed wired board DL and the right eye printed wired board DR perform image display operations on the basis of the corrected images from the left eye correction processing circuit GCa and the right eye correction processing circuit GCb by display drivers DDa, DDb respectively provided thereto, and display the images on the first display element 80a and the second display element 80b.

Figure 6:
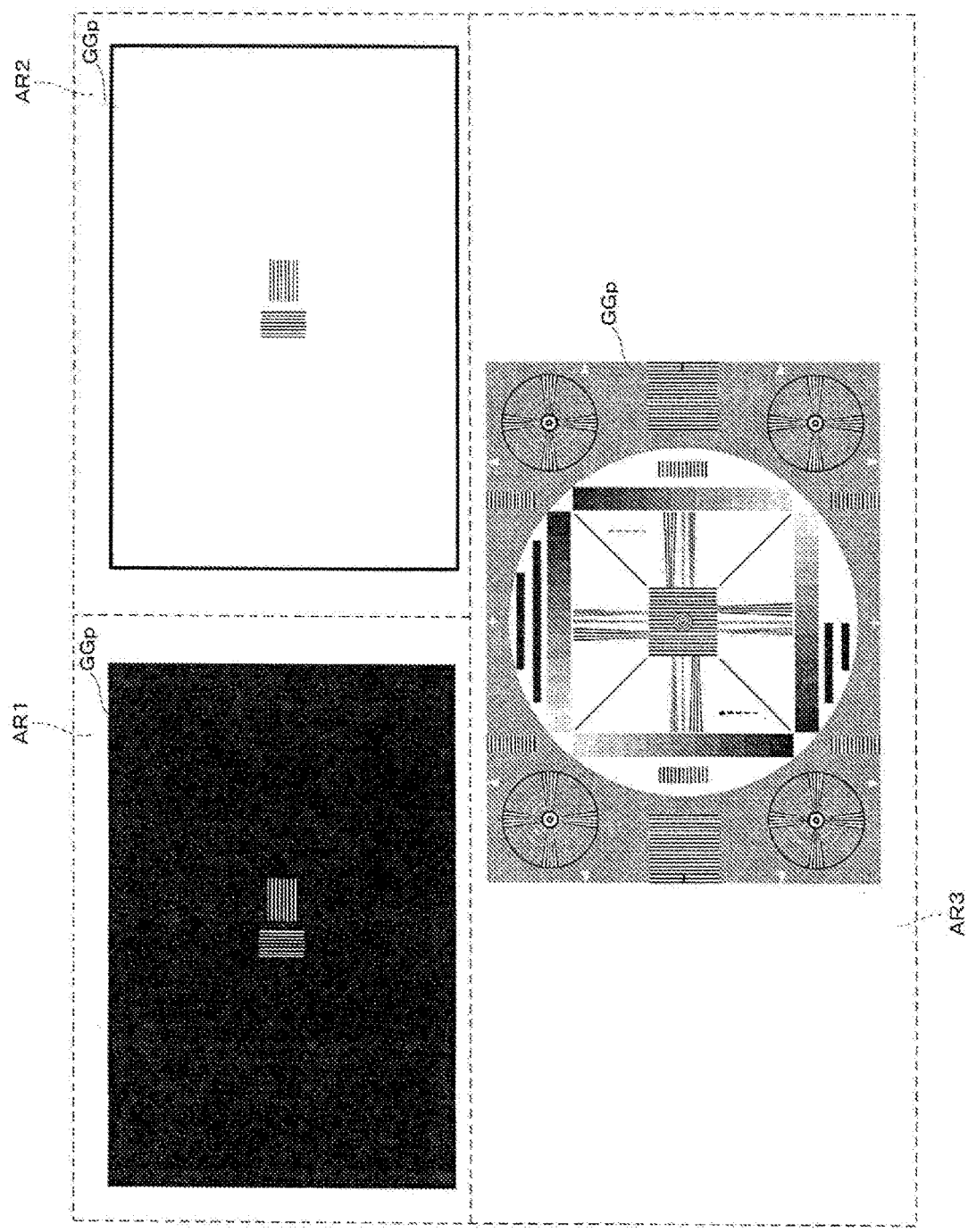
FIG. 6 is an image view illustrating an example of a resolution pattern for diopter adjustment to be visually recognized by a user.

Below, resolution patterns displayed at the time of diopter adjustment in the diopter adjustment circuit DA will be described with reference to FIG. 6. The diopter adjustment circuit DA displays, for example, resolution patterns GGp illustrated in a first region AR1 to a third region AR3 in FIG. 6 as an original image of a diopter adjustment screen. Note that, from among the resolution patterns GGp, when the resolution pattern is configured by white resolution lines on a black background as in the example illustrated in the first region AR1, even with a display for only one eye, adjustment is possible with little fatigue. On the other hand, when the resolution pattern is configured by black resolution lines on a white background as in the example illustrated in the second region AR2, even with a see-through type as in this exemplary embodiment, it is possible to focus on the resolution lines without thinking about the background. In addition to the above, for example, a general resolution chart pattern may be displayed as in the example illustrated in the third region AR3.

In this exemplary embodiment, as described above, the operation detection device DD is configured to perform a diopter adjustment by the resolution pattern such as described, one eye at a time.

Figure 7:
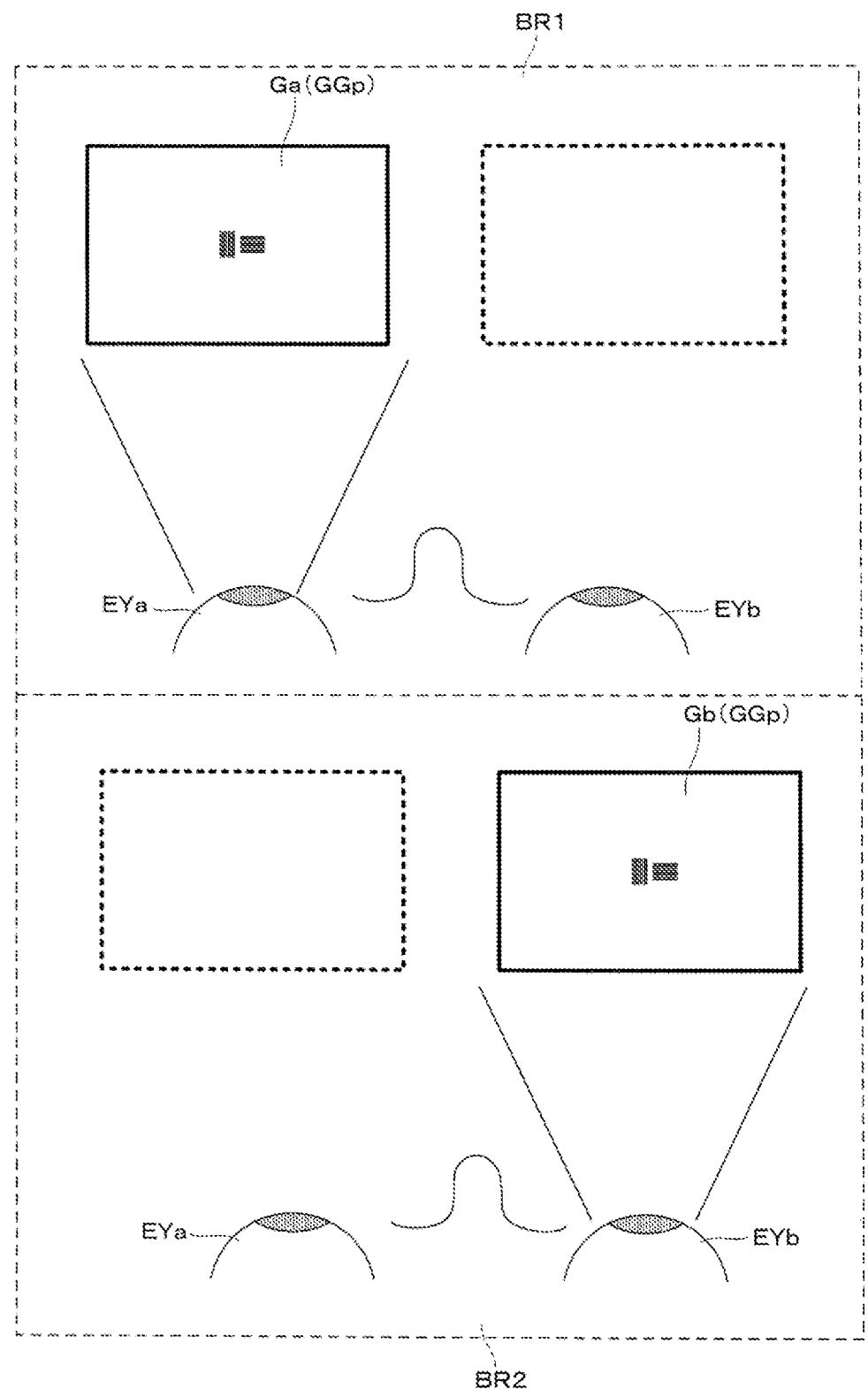
FIG. 7 is a conceptual view illustrating an example of a state of diopter adjustment.

Specifically, first, as illustrated in a first region BR1 in FIG. 7, the resolution pattern GGp is projected as an image Ga to be visually recognized by a left eye EYa, and the user US is prompted to adjust the diopter of the left eye EYa. At this time, on a right eye EYb side, display is suppressed in order to place the focus on diopter adjustment of the left eye EYa.

After diopter adjustment of the left eye EYa, the resolution pattern GGp is projected as an image Gb to be visually recognized by the right eye EYb as illustrated in a second region BR2, and the user US is prompted to adjust the diopter of the right eye EYb. At this time, on the left eye EYa side, display is suppressed in order to place the focus on diopter adjustment of the right eye EYb.

The display operation above is performed on the basis of the detection by the operation detection device DD. To perform the display switching described above, for example, the operation detection device DD detects whether or not an operation related to diopter detection by the user US (for example, a dial adjustment operation) is being performed. The operation being detected means that diopter adjustment is being performed for the corresponding eye, and the operation not being detected on either side means that diopter adjustment is completed.

Figure 8:
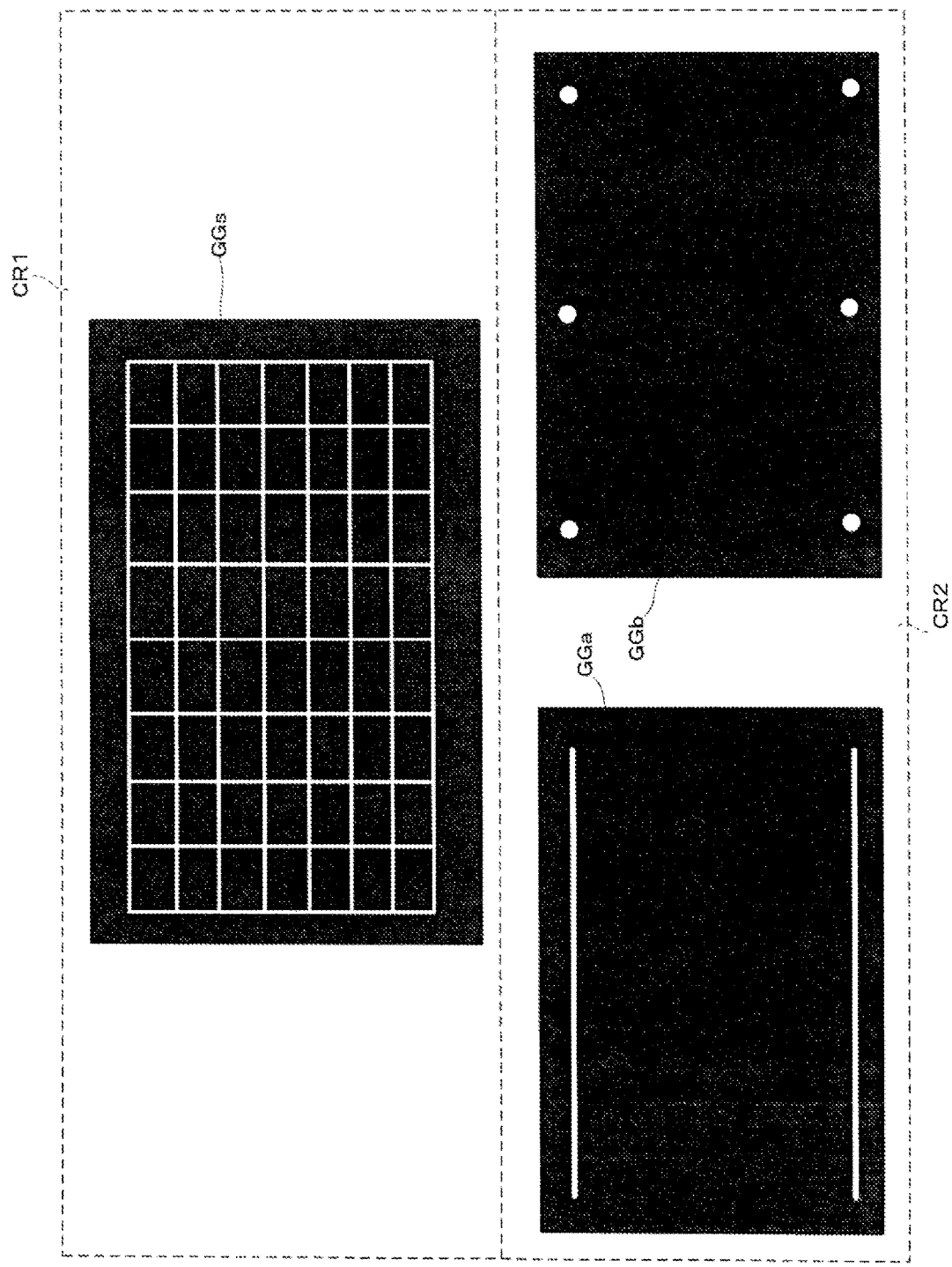
FIG. 8 is an image view showing an example of an image pattern for distortion correction to be visually recognized by a user.

Below, resolution patterns displayed for various corrections, such as distortion correction, of the corrections in the correction processing circuit GC will be described with reference to FIG. 8. The correction processing circuit GC' or the left eye correction processing circuit GCa and the right eye correction processing circuit GCb display, for example, the correction image patterns illustrated in a first region CR1 and a second region CR2 in FIG. 8 as an original image of a correction screen. For example, an image pattern GGs having a lattice shape such as illustrated in the first region CR1 may be displayed on both the left side and the right side. In this case, by displaying an image having a lattice shape for both eyes, it is possible to confirm whether the image appears partially distorted in a depth direction or the lines appear partially misaligned, depending on the distortion state, and thus whether partial depth distortion or line misalignment has occurred. If there is a problem, it is conceivable that, for example, selectable patterns are prepared in advance in a correction table, and a pattern is appropriately selected from these patterns to make an adjustment, or the like. For example, it is conceivable to adopt a mode in which it is possible to select, from the current options, which correction pattern of the images on the left side and the right side is closest to the other correction pattern.

Figure 9:
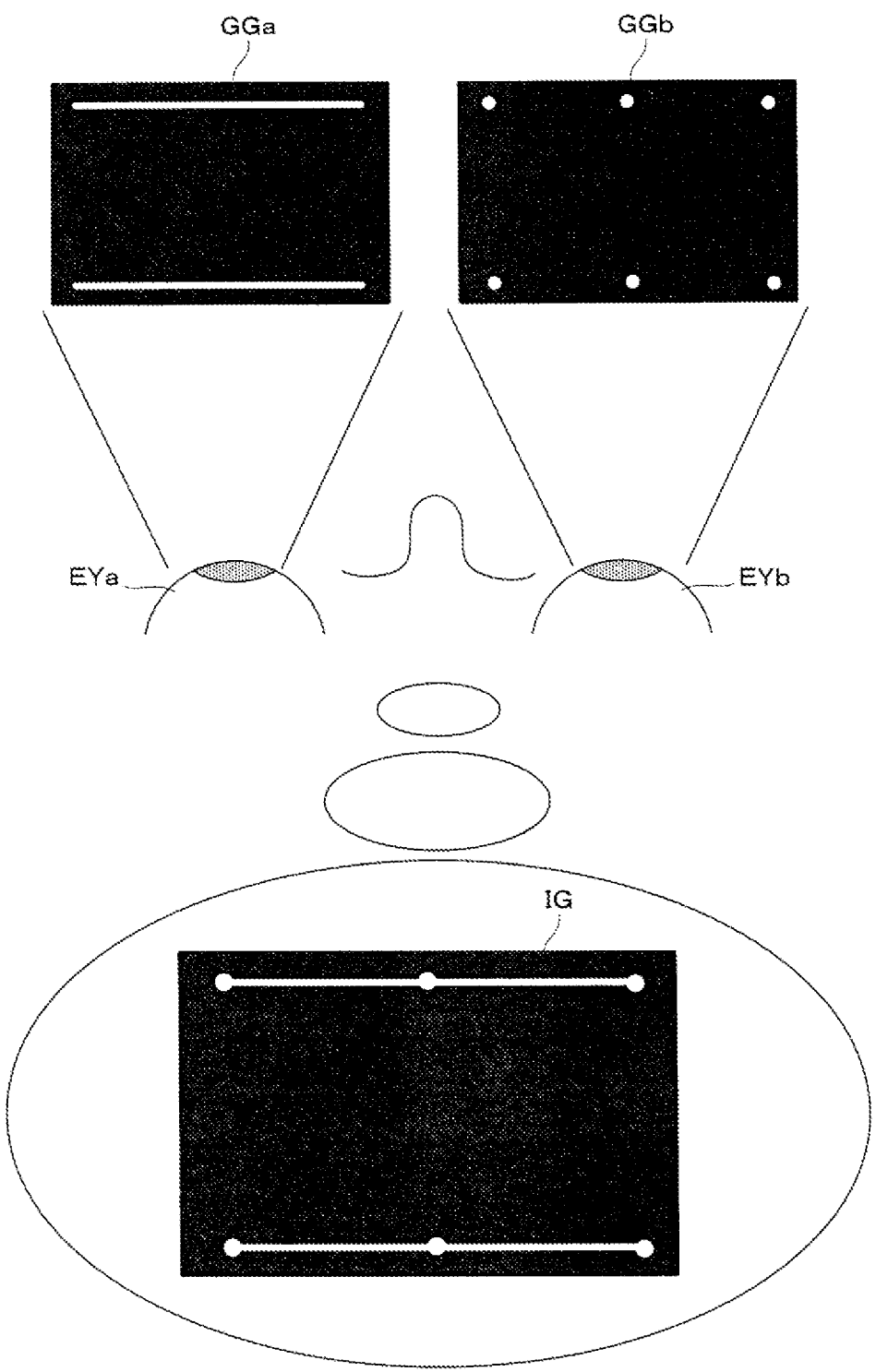
FIG. 9 is a conceptual view illustrating an example of a state of distortion adjustment.

Further, unlike the case described above, a mode can be adopted in which, as illustrated in the second region CR2 and in FIG. 9, pattern images GGa, GGb, which are different for the left eye and the right eye, are visually recognized.

Specifically, in the illustrated case, horizontal lines are displayed above and below for the left eye, and three dots are displayed above and below for the right eye. In this case, as a result of being visually recognized by the user US, it is confirmed whether the dots can be aligned with the upper and lower lines without much effort, that is, whether the user US can easily visually recognize the image as a virtual image IG drawn in his or her mind. In this case as well, if there is a problem, it may be possible to have the user US make an appropriate selection in the correction table to make an adjustment, for example.

Figure 10:
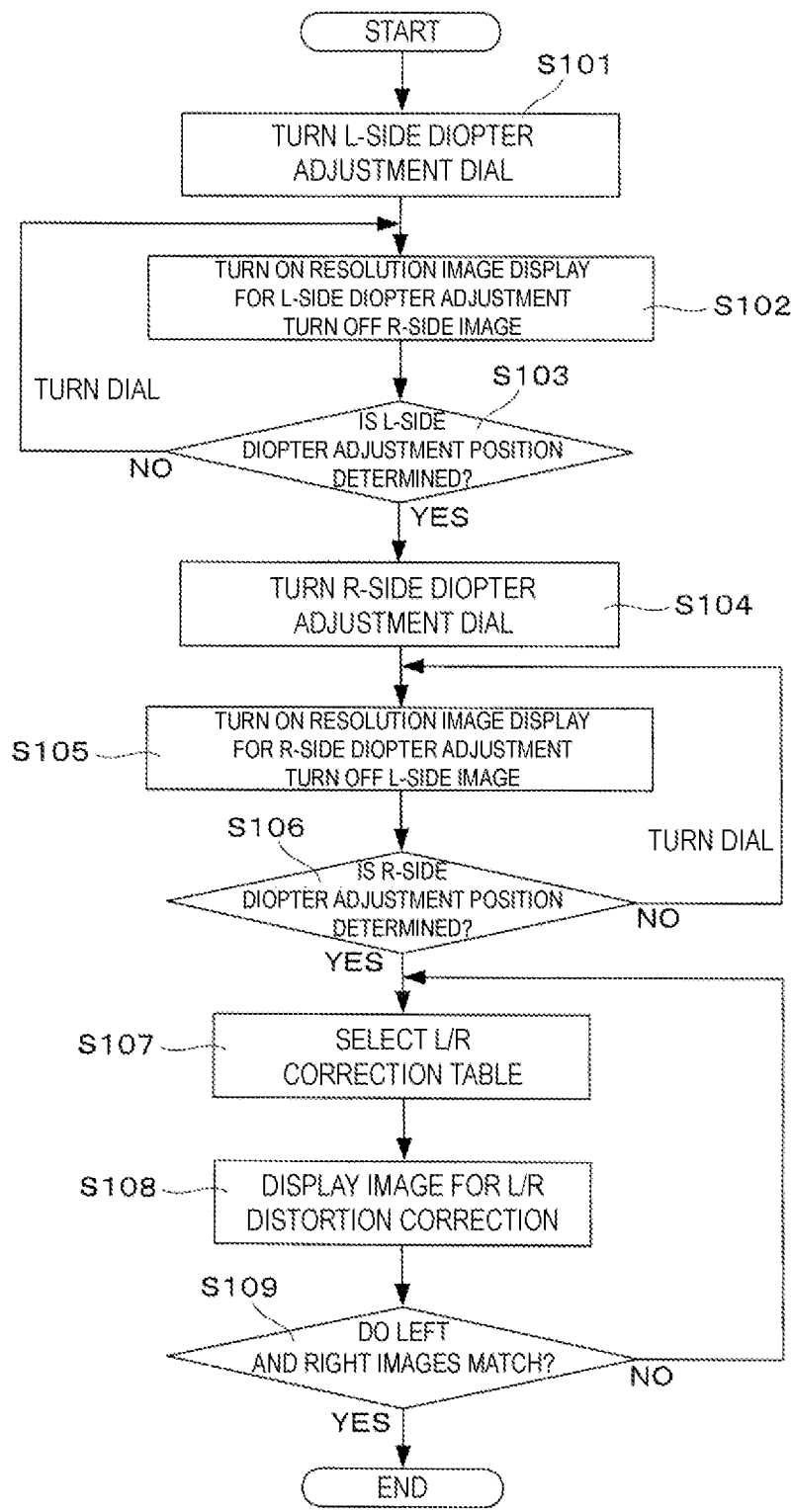
FIG. 10 is a flowchart for describing an example of an operation of diopter adjustment and distortion correction.

Below, an example of an operation of diopter adjustment and distortion correction of the wearable display device 100 will be described with reference to a flowchart in FIG. 10. Here, in order to simplify the description, description will be made under the assumption that an adjustment dial for diopter adjustment is prepared for the left side and the right side, and the user US turns the adjustment dial to carry out diopter adjustment for each of the left side and the right side at the time of diopter adjustment. That is, the user US positions the dial to the diopter that provides the best visibility, in accordance with his or her accommodative capacity.

When each component of the wearable display device 100 is activated, first, from among diopter adjustment and distortion correction, diopter adjustment is performed, and thus the left eye diopter adjustment unit DAa of the diopter adjustment circuit DA prompts the user US to turn the dial for left eye diopter adjustment, and the dial is turned (step S101). When the diopter adjustment dial for the left eye is turned in step S101, the operation detection device DD of the diopter adjustment circuit DA detects the turn, performs image display for diopter adjustment as an image for the left eye, and suppresses the display on the right eye side (step S102). That is, a display mode such as that illustrated in the first region BR1 in FIG. 7 is formed.

Next, the left eye diopter adjustment unit DAa confirms whether or not an adjustment position has been determined (step S103). Various methods can be used to confirm determination of the adjustment position. For example, it is conceivable to prepare a position determination button along with the diopter adjustment dial for the left eye and, in a case in which it is detected that the button was pressed or in a case in which it is detected in the operation detection device DD that the diopter adjustment dial for the left eye has not been turned for a predetermined time (three seconds) or longer, for example, the adjustment position is regarded as determined (step S103: YES).

On the other hand, in step S103, in a case in which rotation of the diopter adjustment dial for the left eye is continuously detected in the operation detection device DD or the like (step S103: NO), the operation of step S102 is continued.

Next, in step S103, when it is confirmed that the adjustment position for the left eye has been determined, the left eye diopter adjustment unit DAa records the degree of the adjusted diopter calculated on the basis of the determined adjustment position in the memory MC as a measurement result and ends the operation while the right eye diopter adjustment unit DAb of the diopter adjustment circuit DA prompts the user US to turn the dial for diopter adjustment for the right eye, and the dial is turned (step S104).

When the operation detection device DD detects that the diopter adjustment dial for the right eye was turned in step S104, an image is displayed for diopter adjustment as an image for the right eye and the display is suppressed for the left eye side (step S105). That is, a display mode such as that illustrated in the second region BR2 in FIG. 7 is formed.

Next, the right eye diopter adjustment unit DAb confirms whether or not the adjustment position was determined (step S106). In a case in which the rotation of the dial is continuously detected or the like (step S106: NO), the operation of step S105 is continued. On the other hand, when it is confirmed that the adjustment position for the right eye has been determined (step S106: YES), the right eye diopter adjustment unit DAb records the degree of the adjusted diopter calculated on the basis of the determined adjustment position in the memory MC as a measurement result, and ends the operation. Further, in conjunction, the diopter adjustment circuit DA outputs the fact that the diopter adjustment is completed and the measurement result of the diopter adjustment to the correction processing circuit GC.

Next, the correction processing circuit GC, that is, the left eye correction processing circuit GCa and the right eye correction processing circuit GCb, that receives the output from the diopter adjustment circuit DA selects the correction amount corresponding to the measurement result of the diopter adjustment from the image conversion tables TTa, TTb for correction (step S107).

Here, in the operation from step S106 to step S107, from a different viewpoint, the mode is one in which the left eye correction processing circuit GCa and the right eye correction processing circuit GCb, as the first image correction device and the second image correction device, start correction after confirmation of completion of diopter adjustment in the first display device 100A and the second display device 100B.

After the selection in step S107, the left eye correction processing circuit GCa and the right eye correction processing circuit GCb perform correction image display on the basis of the selected correction content (step S108). That is, image display is performed as illustrated in FIG. 9. Further, at this time, final buttons (for example, a "Yes" button and a "No" button) for allowing the user US to decide whether or not the mode of image display visually recognized in step S108 is favorable or not are prepared. In a case in which the user US determines that the left and right images are visually aligned from the state displayed in step S108, the user US presses the final button ("Yes" button), thereby ending the operation of diopter adjustment and distortion correction. That is, when it is confirmed that the final button ("YES" button) has been pressed (step S109: YES) for the display mode in step S108, the wearable display 100 ends the series of operations. On the other hand, when it is confirmed in step S109 that the button has not been pressed or the negative final button ("No" button) is pressed (step S109: NO), the diopter adjustment circuit DA returns to step S107 to select another correction amount from the image conversion tables TTa, TTb for correction, and the subsequent operation is repeated.

As described above, the wearable display device 100 as the head-mounted display (HMD) according to this exemplary embodiment includes the first display device 100A configured to display an image on one of the left side and the right side, the first diopter adjustment device DIa configured to adjust the diopter of the first display device 100A, the left eye correction processing circuit GCa as the first image correction device configured to correct the display image by the first display device 100A in accordance with the degree of diopter adjustment by the first diopter adjustment device DIa, the second display device 100B configured to display an image on the other of the left side and the right side, the second diopter adjustment device DIb configured to adjust the diopter of the second display device 100B, and the right eye correction processing device GCb as the second image correction device configured to correct the display image by the second display device 100B in accordance with the degree of diopter adjustment by the second diopter adjustment device DIb.

In the wearable display device 100 described above, in the adjustment performed on each of the left side and the right side, after diopter adjustment, the display image is corrected in accordance with the degree of diopter adjustment, making it possible to suppress the occurrence of a difference in the images to be visually recognized on the left side and the right side caused by the influence of tolerances or the like of the left and right optical systems and by the difference in the diopters of the left and right eyes of the user, and avoid or alleviate the fatigue of the user (observer) when visually recognizing an image.

Below, the principle of diopter adjustment in the non-telecentric optical system described above and an example of the amount to be adjusted in the mode described above will be described.

Figure 11:
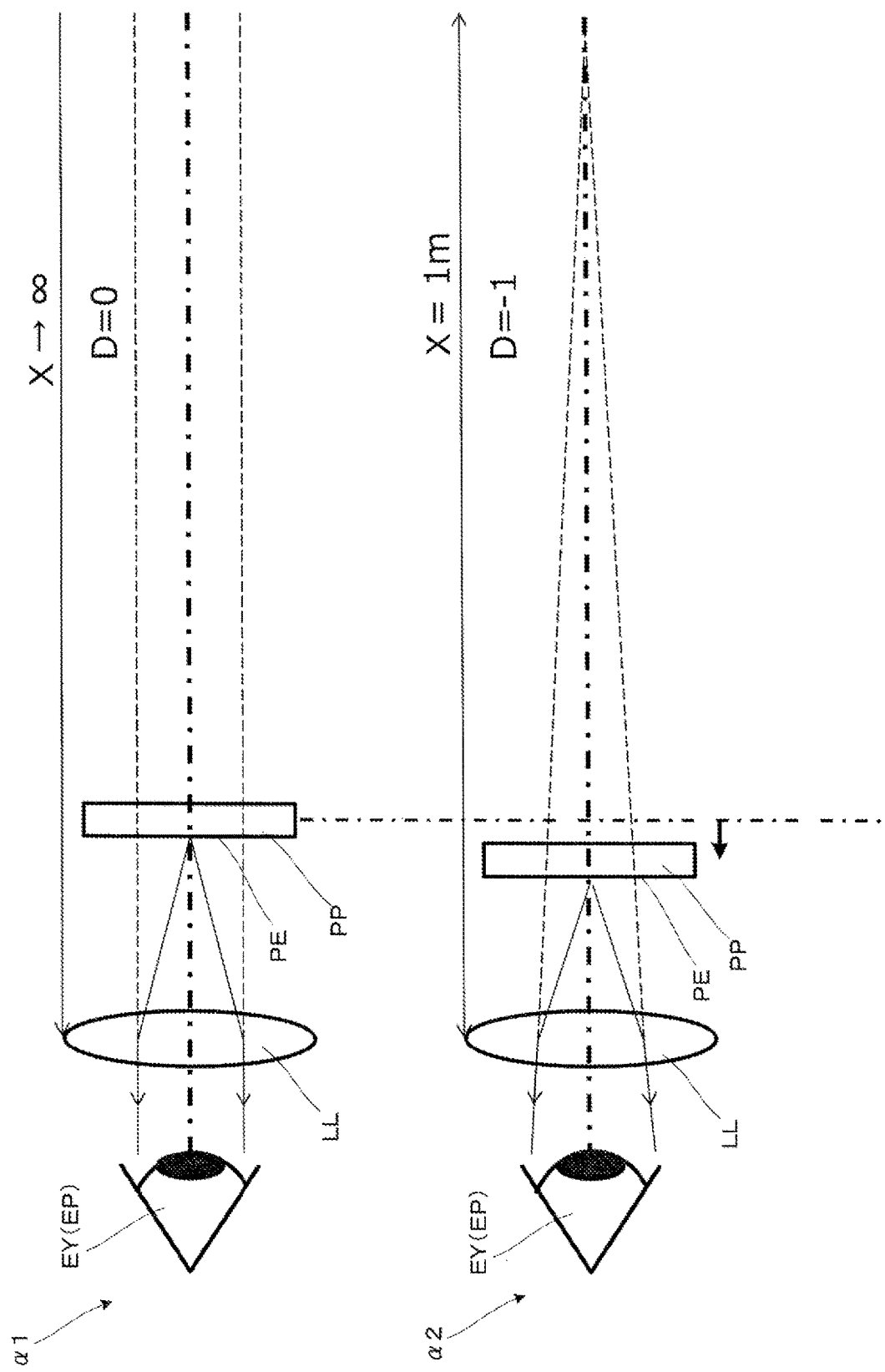
FIG. 11 is a side view for conceptually describing the principle of diopter adjustment.
Figure 12:
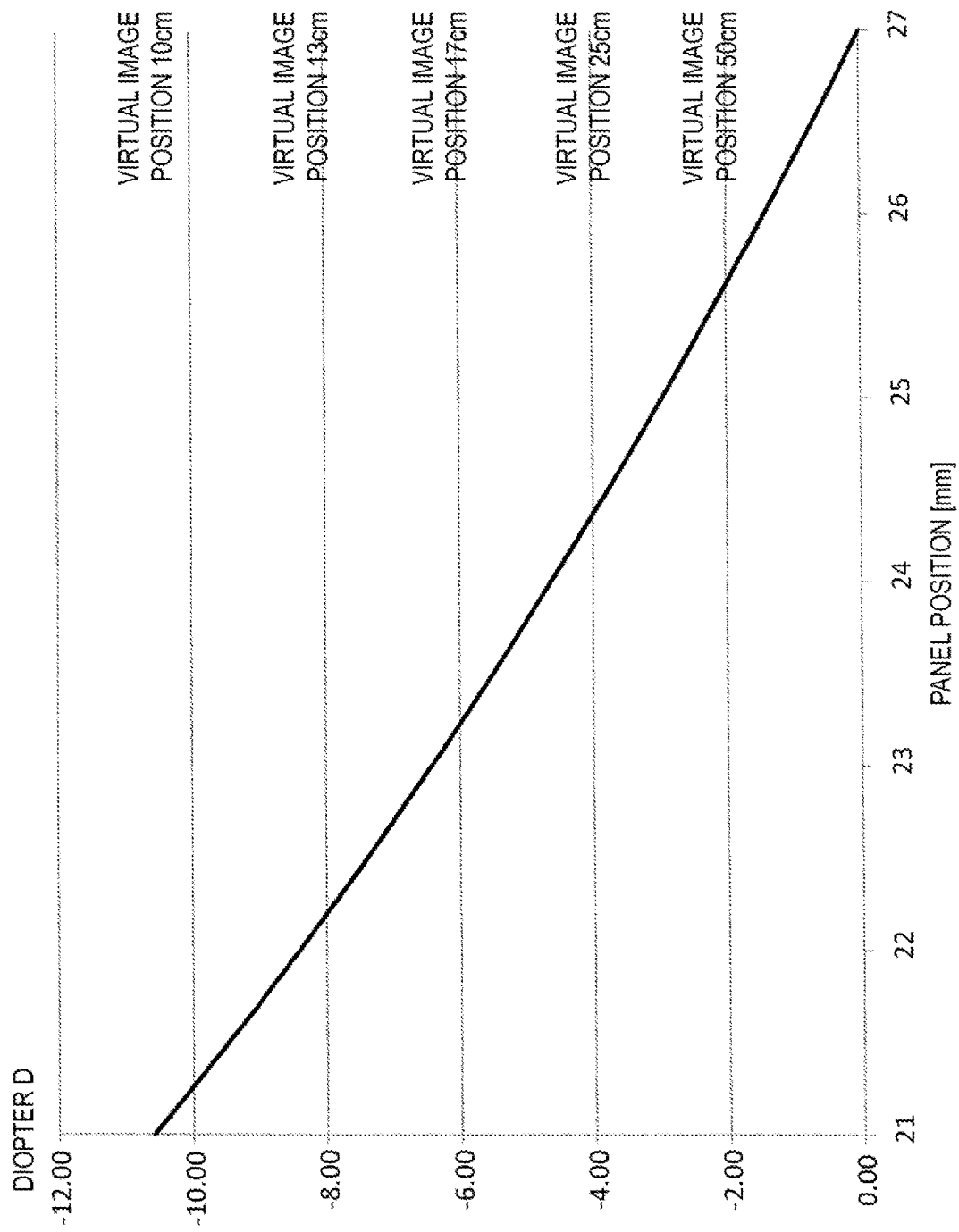
FIG. 12 is a graph showing a relationship between an adjustment amount and a displacement of a panel in diopter adjustment.

FIG. 11 is a side view for conceptually describing the principle of diopter adjustment. While a relay system is assembled in the mode described above, for the sake of simplicity, the system can be defined by the relationship between a lens LL of a non-telecentric optical system such as illustrated in FIG. 11 and a panel position PP of a display element PE. Here, a state α1 illustrates a case in which the panel position PP is at a principal point of the lens LL, and a state α2 illustrates a case in which the panel position PP has been brought closer toward the lens LL relative to the principal point. In these cases, given D as the value of the diopter as described above, in the state α1, a distance X from the position of the lens LL to a virtual image position is infinite, and D→0. In contrast, in the state α2, the distance X from the position of the lens LL to the virtual image position is about 1 m, for example, and D is about −1. Note that, in certain optical systems, for example, in the case of such an optical system as that of the mode illustrated in FIG. 3 and the like, the relationship between the diopter D and the displacement of the panel position PP, that is, displacement of the display element 80 in the optical axis direction, it is known that the system will be as shown in the graph of FIG. 12. That is, in the case of FIG. 12, when described with reference to the conceptual diagram of FIG. 11, the panel position PP (that is, position of the display element 80) in the state α1 is 27 mm from the position of the lens LL (that is, position of the projection lens 30) and, as the panel position PP (display element 80) approaches the lens LL (projection lens 30) from this state, the state becomes one such as the state α2. In the case of FIG. 12, if a panel position adjustment mechanism of approximately 2.5 mm is provided, the diopter D can be adjusted from 0 to −4.

Figure 13:
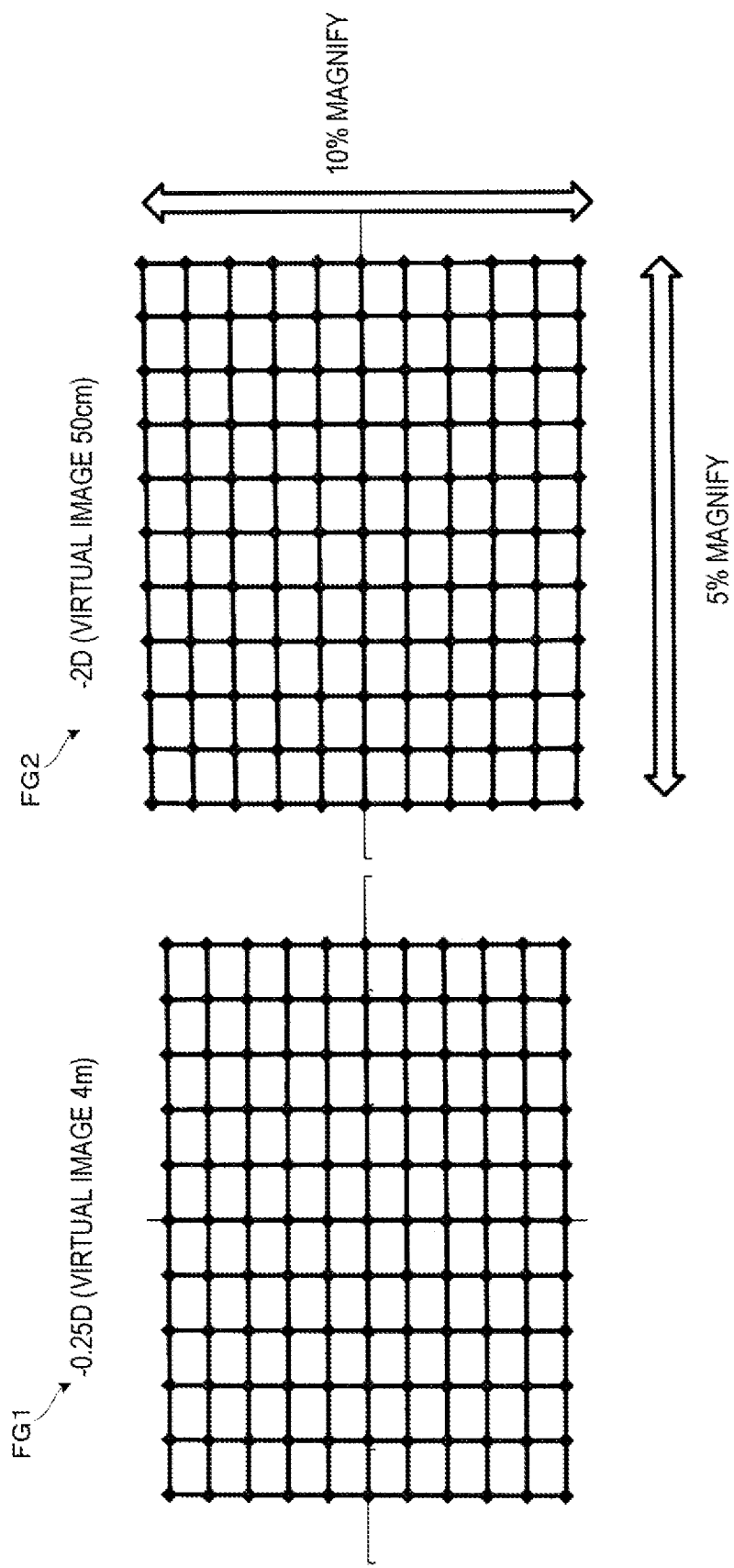
FIG. 13 is a conceptual view for describing distortion occurrence associated with diopter adjustment.

On the other hand, distortion of the image also occurs in association with a movement such as described above. For example, FIG. 13 is a conceptual diagram for describing distortion occurrence associated with diopter adjustment. In FIG. 13, as an example, a shape in which D is −0.25 (the distance X to virtual image position=4 m) is denoted by FG1 and a shape in which D is −2 (the distance X to virtual image position=50 cm) is denoted by FG2, and these are compared. In this case, while the shape FG2 is larger than the shape FG1, an enlargement ratio thereof is about 5% in the lateral direction (horizontal direction), and about 10% in the longitudinal direction (vertical direction). That is, the enlargement ratios differ between the horizontal and vertical directions. Furthermore, in the case of so-called lateral (horizontal) light guidance such as in this exemplary embodiment, the manner of vertical enlargement on the left side and the right side of the screen differs between the right eye and the left eye. In this exemplary embodiment, such a problem is solved by selecting an appropriate distortion correction after diopter adjustment.

For example, it is known that when the enlargement ratio of a field-of-view (FOV) screen exceeds 1%, there may be a problem in binocular vision at a screen end portion. On the other hand, considering the difference in enlargement ratios between the horizontal and vertical directions, it is conceivable that a screen distortion of, for example, up to 10% may occur. In response, by providing approximately 10 image conversion tables TTa, TTb for correction, for example, it is possible to allow the user US to visually recognize an image in the same distortion-free state as when a diopter adjustment is not made.

Second Exemplary Embodiment

Below, the head-mounted display (HMD) according to a second exemplary embodiment of the present disclosure will be described with reference to FIG. 14. Note that a wearable display device 300 according to this exemplary embodiment is a modified example of the wearable display device 100 according to the first exemplary embodiment, and differs from the first exemplary embodiment in that, rather than see-through, the type is one in which the virtual reality (VR) of a so-called closed type is visually recognized. However, the other points described above are the same as those of the first exemplary embodiment, and thus detailed descriptions will be omitted for components other than those described above.

Figure 14:
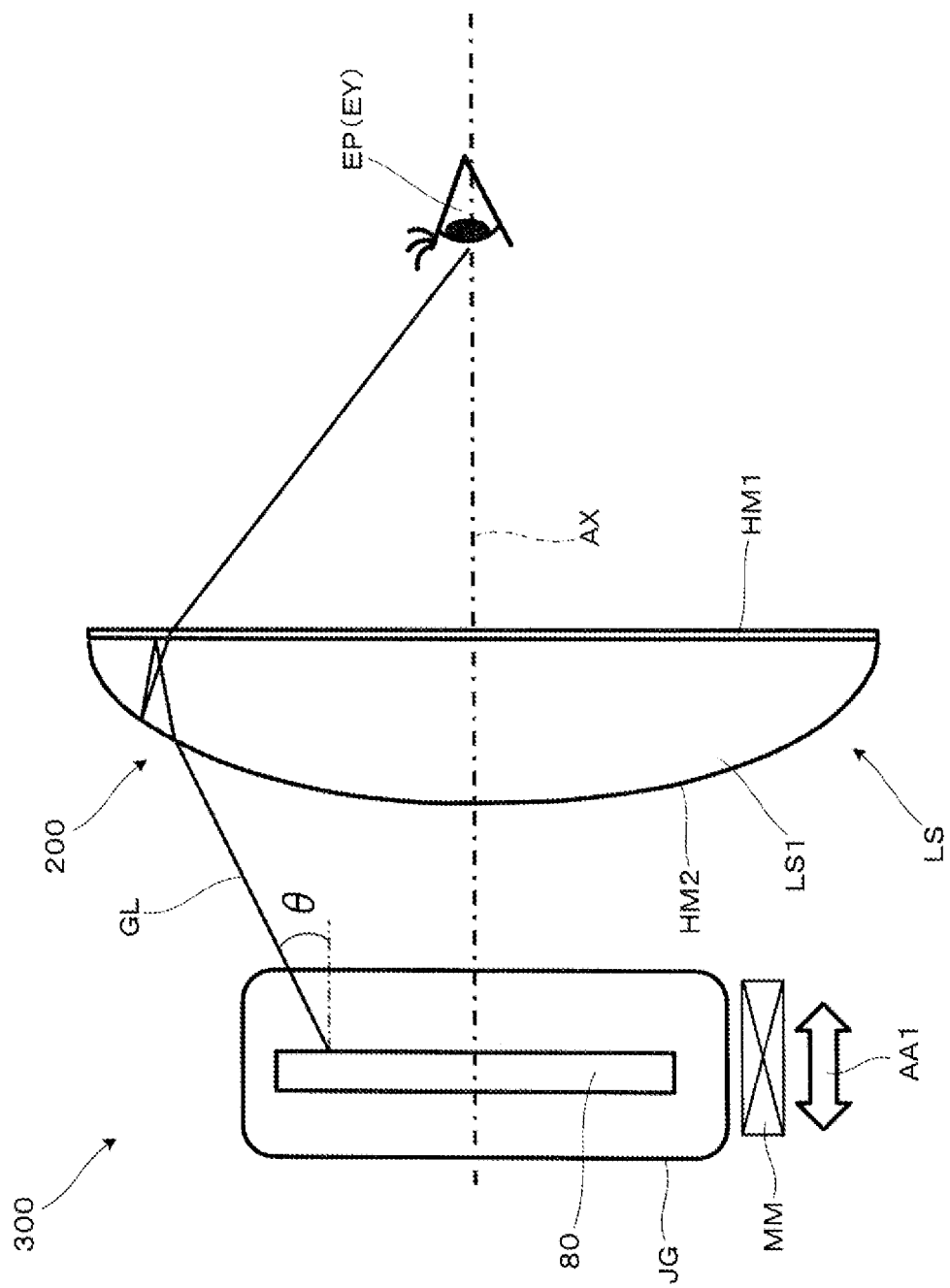
FIG. 14 is a conceptual side view for describing the head-mounted display according to a second exemplary embodiment.

FIG. 14 is a conceptual side view for illustrating the wearable display device 300 as the head-mounted display (HMD) according to this exemplary embodiment. The wearable display device 300 includes a projection optical system 200 as a non-telecentric optical system, and the display element 80. The display element 80 is fixed in posture by the jig JG having a housing shape, and is moved by the drive mechanism MM along the optical axis AX for each jig JG. Further, the projection optical system 200 includes a lens LS1 and half mirrors HM1, HM2 provided to the lens LS1. For example, of the components emitted from the display element 80, those that pass through an optical path such as illustrated in the drawing via refraction, reflection, and transmission at the lens LS1 and the half mirrors HM1, HM2 reach an eye EY and become the imaging light GL to be visually recognized. In this case as well, for example, the system is a non-telecentric optical system in which an angle θ of the main beam of peripheral light of the display element 80 is large to some extent, and thus it is possible to adjust the diopter within a sufficient range by a slight movement of the display element 80.

Modifications and Other Matters

The structure described above is exemplary, and various changes can be made to the extent that similar functions can be achieved.

For example, in the above description, the drive mechanism MM can be automatically driven as well, but may be configured to be manually moved. In this case as well, as long as the measurement of displacement can be achieved with a certain degree of accuracy, step-wise correction patterns can be created in accordance with the degree of movement. Further, in the above, the correction pattern is set in advance in order to alleviate calculation processing for correction, but conceivably the correction amount may be calculated each time, or an interpolation method of calculating an intermediate correction amount using a plurality of correction patterns may be adopted. Further, the correction amount may be automatically calculated and the correction pattern may be automatically set.

In the description above, the display element 80 is a panel for an organic EL display panel or an LCD, but may be a self-light-emitting display element represented by an LED array, a laser array, a quantum dot light-emitting element, or the like. Furthermore, the display element 80 may be a display that uses a laser scanner obtained by combining a laser light source and a scanner. Note that liquid crystal on silicon (LCOS) technology may be used instead of the LCD panel.

As described above, a first head-mounted display according to an aspect of the present disclosure includes a first display device configured to display an image on one of a left side and a right side, a first diopter adjustment device configured to adjust a diopter of the first display device, a first image correction device configured to correct an image displayed by the first display device in accordance with a degree of diopter adjustment by the first diopter adjustment device, a second display device configured to display an image on the other of the left side and the right side, a second diopter adjustment device configured to adjust a diopter of the second display device, and a second image correction device configured to correct an image displayed by the second display device in accordance with a degree of diopter adjustment by the second diopter adjustment device.

In the head-mounted display described above, in the adjustments made on the left side and the right side, respectively, after diopter adjustment, the display image is corrected in accordance with the degree of diopter adjustment, making it possible to suppress the occurrence of a difference in the images to be visually recognized on the left side and the right side, the difference being caused by influence of tolerances or the like of the left and right optical systems and by a difference in the diopters of the left and right eyes of the user, and avoid or alleviate the fatigue of the user (observer) when visually recognizing an image.

According to a specific aspect, the first diopter adjustment device is configured to move a first optical member constituting the first display device in an optical axis direction to adjust the diopter, and the second diopter adjustment device is configured to move a second optical member constituting the second display device in the optical axis direction to adjust the diopter. In this case, the diopter can be adjusted by movement of the first optical member.

According to another aspect, the first display device includes a first display element and a first non-telecentric optical system, the first diopter adjustment device is configured to move the first display element as the first optical member relative to the first non-telecentric optical system, the second display device includes a second display element and a second non-telecentric optical system, and the second diopter adjustment device is configured to move the second display element as the second optical member relative to the second non-telecentric optical system. In this case, by moving the first display element relative to the non-telecentric optical system, it is possible to adjust the diopter by a simple movement structure.

According to yet another aspect, the first image correction device is configured to correct a distortion or a size of an image displayed by the first display device and the second image correction device is configured to correct a distortion or a size of an image displayed by the second display device. In this case, image distortion and enlargement or shrinkage that occur in association with diopter adjustment in the first and second display devices can be eliminated in the first and second correction devices.

According to yet another aspect, the first image correction device and the second image correction device are configured to make a correction based on an image conversion table for correction. In this case, a burden of calculation processing in relation to correction can be alleviated.

According to yet another aspect, the image conversion table for correction defines, in a step-wise manner, a correction amount corresponding to a degree of diopter adjustment by the first diopter adjustment device and the second diopter adjustment device. In this case, a necessary correction can be made by selecting a correction amount from correction amounts defined in advance in a step-wise manner in accordance with the degree of diopter adjustment.

According to yet another aspect, the first image correction device and the second image correction device are configured to start correction after confirmation of completion of diopter adjustment in the first display device and the second display device.

According to yet another aspect, the head-mounted display further includes an operation detection device configured to detect operation of the first diopter adjustment device and the second diopter adjustment device, and the operation detection device is configured to display a diopter adjustment screen on a display device, operation of which is detected, and to not display the diopter adjustment screen on a display device, operation of which is not detected, from among the first display device and the second display device. In this case, the diopter can be steadily adjusted on one side at a time.

As described above, a second head-mounted display according to a specific aspect includes a display device configured to display an image, and a diopter adjustment device configured to move an optical member constituting the display device in an optical axis direction to adjust a diopter of the display device. In the head-mounted display described above, diopter adjustment is possible by movement of the optical member.

What is claimed is:
1. A head-mounted display comprising:
a first display device configured to display an image on one of a left side and a right side;
a first diopter adjustment device configured to adjust a diopter of the first display device;

a first image correction device configured to correct an image displayed by the first display device in accordance with a degree of diopter adjustment by the first diopter adjustment device;

a second display device configured to display an image on the other of the left side and the right side;

a second diopter adjustment device configured to adjust a diopter of the second display device; and a second image correction device configured to correct an image displayed by the second display device in accordance with a degree of diopter adjustment by the second diopter adjustment device.

2. The head-mounted display according to claim 1, wherein the first diopter adjustment device is configured to move a first optical member constituting the first display device in an optical axis direction to adjust the diopter and the second diopter adjustment device is configured to move a second optical member constituting the second display device in the optical axis direction to adjust the diopter.

3. The head-mounted display according to claim 2, wherein the first display device includes a first display element and a first non-telecentric optical system, the first diopter adjustment device is configured to move the first display element as the first optical member relative to the first non-telecentric optical system, the second display device includes a second display element and a second non-telecentric optical system, and the second diopter adjustment device is configured to move the second display element as the second optical member relative to the second non-telecentric optical system.

4. The head-mounted display according to claim 1, wherein the first image correction device is configured to correct a distortion or a size of an image displayed by the first display device and the second image correction device is configured to correct a distortion or a size of an image displayed by the second display device.

5. The head-mounted display according to claim 1, wherein the first image correction device and the second image correction device are configured to make a correction based on an image conversion table for correction.

6. The head-mounted display according to claim 5, wherein the image conversion table for correction defines, in a step-wise manner, a correction amount corresponding to a degree of diopter adjustment performed by the first diopter adjustment device and the second diopter adjustment device.

7. The head-mounted display according to claim 1, wherein the first image correction device and the second image correction device are configured to start correction after confirmation of completion of diopter adjustment in the first display device and the second display device.

8. The head-mounted display according to claim 1, comprising:

an operation detection device configured to detect operation of the first diopter adjustment device and the second diopter adjustment device, wherein the operation detection device is configured to display a diopter adjustment screen on a display device, operation of which is detected, and to not display the diopter adjustment screen on a display device, operation of which is not detected, from among the first display device and the second display device.

9. A head-mounted display comprising:

a display device configured to display an image; and a diopter adjustment device configured to move an optical member constituting the display device in an optical axis direction to adjust a diopter of the display device.

* * * * *